United States Patent
Yana et al.

(10) Patent No.: US 12,035,051 B2
(45) Date of Patent: Jul. 9, 2024

(54) IMAGING SYSTEM AND CONTROL METHOD

(71) Applicant: SONY GROUP CORPORATION, Tokyo (JP)

(72) Inventors: Kanako Yana, Tokyo (JP); Kazuyuki Shibata, Tokyo (JP); Katsunari Oda, Tokyo (JP); Jumpei Kimura, Tokyo (JP); Hiroshi Takagi, Tokyo (JP); Hiroaki Minami, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 15 days.

(21) Appl. No.: 17/756,924

(22) PCT Filed: Dec. 2, 2020

(86) PCT No.: PCT/JP2020/044798
§ 371 (c)(1),
(2) Date: Jun. 6, 2022

(87) PCT Pub. No.: WO2021/124883
PCT Pub. Date: Jun. 24, 2021

(65) Prior Publication Data
US 2022/0408007 A1    Dec. 22, 2022

(30) Foreign Application Priority Data
Dec. 16, 2019  (JP) ................. 2019-226863

(51) Int. Cl.
*G03B 15/05* (2021.01)
*H04N 23/56* (2023.01)
(Continued)

(52) U.S. Cl.
CPC ............. *H04N 23/74* (2023.01); *G03B 15/05* (2013.01); *H04N 23/56* (2023.01);
(Continued)

(58) Field of Classification Search
CPC ...... H04N 23/56; H04N 23/66; H04N 23/662; H04N 23/631; H04N 23/633; H04N 23/74;
(Continued)

(56) References Cited

U.S. PATENT DOCUMENTS 10,735,666 B2 *  8/2020  Suzuki ................... G03B 15/03
2009/0097835 A1  4/2009  Kunishige et al.
(Continued)

FOREIGN PATENT DOCUMENTS

CN    101414096 A    4/2009
CN    105306812 A    2/2016
(Continued)

OTHER PUBLICATIONS

International Search Report and Written Opinion of PCT Application No. PCT/JP2020/044798, dated Feb. 22, 2021, 10 pages of ISRWO.

*Primary Examiner* — Daniel M Pasiewicz
(74) *Attorney, Agent, or Firm* — CHIP LAW GROUP

(57) ABSTRACT

The present disclosure relates to an imaging system and a control method that make it possible to implement setting for an external flash by an operation on a camera side. Setting coordination processing is executed in which setting information of an external flash (13) is transmitted and received between a first communication unit (67A) and a second communication unit (47). Further, a second display unit is caused to display a setting screen to be used for setting a setting item of the external flash, and the setting information changed by an operation on the second operation unit is caused to be transmitted from the imaging device (12) to the external flash (13) via the first communication unit (67A) and the second communication unit (47), and a setting for the external flash (13) is caused to be applied.

13 Claims, 14 Drawing Sheets

(51) Int. Cl.
*H04N 23/63* (2023.01)
*H04N 23/663* (2023.01)
*H04N 23/74* (2023.01)

(52) U.S. Cl.
CPC ......... *H04N 23/631* (2023.01); *H04N 23/663* (2023.01); *G03B 2215/0557* (2013.01)

(58) Field of Classification Search
CPC ............ G03B 15/05; G03B 2215/0514; G03B 2215/0557
See application file for complete search history.

(56) References Cited

U.S. PATENT DOCUMENTS

2009/0196595 A1* 8/2009 Okubo .................. G03B 15/05
396/287
2015/0373242 A1 12/2015 Morita

FOREIGN PATENT DOCUMENTS

| | | |
|---|---|---|
| JP | 2006-064763 A | 3/2006 |
| JP | 2009-031462 A | 2/2009 |
| JP | 2009-098298 A | 5/2009 |
| JP | 2010-252041 A | 11/2010 |
| JP | 2016-009032 A | 1/2016 |

* cited by examiner

FIG. 5A

```
EXTERNAL FLASH CUSTOM SETTING
FLASH LIGHT DISTRIBUTION TYPE        STANDARD
REGISTRATION
AF ASSIST LIGHT BRIGHTNESS               DARK
CHARGE SETTING      EXTERNAL+INTERNAL BATTERY
TEST LIGHT EMISSION                      ONCE
TTL LIGHT AMOUNT MEMORY                    ON
```

FIG. 5B

```
EXTERNAL FLASH CUSTOM SETTING
FLASH LIGHT DISTRIBUTION TYPE        STANDARD
REGISTRATION
AF ASSIST LIGHT BRIGHTNESS               DARK
TEST LIGHT EMISSION                      ONCE
```

IMAGING SYSTEM AND CONTROL METHOD

CROSS REFERENCE TO RELATED APPLICATIONS

This application is a U.S. National Phase of International Patent Application No. PCT/JP2020/044798 filed on Dec. 2, 2020, which claims priority benefit of Japanese Patent Application No. JP 2019-226863 filed in the Japan Patent Office on Dec. 16, 2019. Each of the above-referenced applications is hereby incorporated herein by reference in its entirety.

TECHNICAL FIELD

The present disclosure relates to an imaging system, a control method, and a program, and more particularly, to an imaging system, a control method, and a program enabled to implement setting for an external flash by an operation on a camera side.

BACKGROUND ART

Conventionally, in an imaging system including a camera and an external flash, an external flash device is mounted on a mounting unit (so-called hot shoe) provided in an upper portion of a body of the camera, and control is performed to cause the external flash device to emit light in synchronization with imaging by the camera. Moreover, in the imaging system, a plurality of external flashes having a wireless communication function can be installed without being mounted on the camera, and light emission of those external flashes can be controlled via wireless communication.

For example, in Patent Document 1, an imaging device is disclosed that can simplify change of a necessary setting condition depending on a connected external strobe.

CITATION LIST

Patent Document

Patent Document 1: Japanese Patent Application Laid-Open No. 2006-64763

SUMMARY OF THE INVENTION

Problems to be Solved by the Invention

Meanwhile, in recent years, it is assumed that various new functions can be provided along with performance improvement of communication between the camera and the external flash, and for example, it is demanded to enable setting of the external flash from the camera side.

The present disclosure has been made in view of such a situation, and makes it possible to implement setting for the external flash by an operation on the camera side.

Solutions to Problems

An imaging system of one aspect of the present disclosure includes: an external flash including a first communication unit, a first display unit, and a first operation unit; and an imaging device including a second communication unit, a second display unit, and a second operation unit, in which setting coordination processing is executed, the setting coordination processing including: transmitting and receiving setting information of the external flash between the first communication unit and the second communication unit; causing the second display unit to display a setting screen to be used for setting a setting item of the external flash; and causing the setting information changed by an operation on the second operation unit to be transmitted from the imaging device to the external flash via the first communication unit and the second communication unit, to cause a setting for the external flash to be applied.

A control method or a program of one aspect of the present disclosure executes setting coordination processing including: transmitting and receiving setting information of the external flash between the first communication unit and the second communication unit; causing the second display unit to display a setting screen to be used for setting a setting item of the external flash; and causing the setting information changed by an operation on the second operation unit to be transmitted from the imaging device to the external flash via the first communication unit and the second communication unit, to cause a setting for the external flash to be applied.

In one aspect of the present disclosure, the setting coordination processing is executed in which: the setting information of the external flash is transmitted and received between the first communication unit and the second communication unit; the second display unit is caused to display the setting screen to be used for setting the setting item of the external flash; and the setting information changed by the operation on the second operation unit is transmitted from the imaging device to the external flash via the first communication unit and the second communication unit, and the setting for the external flash is caused to be applied.

BRIEF DESCRIPTION OF DRAWINGS

FIGS. 5A and 5B are diagrams explaining display or non-display of the setting item on a setting screen.

MODE FOR CARRYING OUT THE INVENTION

Hereinafter, a specific embodiment to which the present technology is applied will be described in detail with reference to the drawings.

<Configuration Example of Imaging System>

Figure 1:
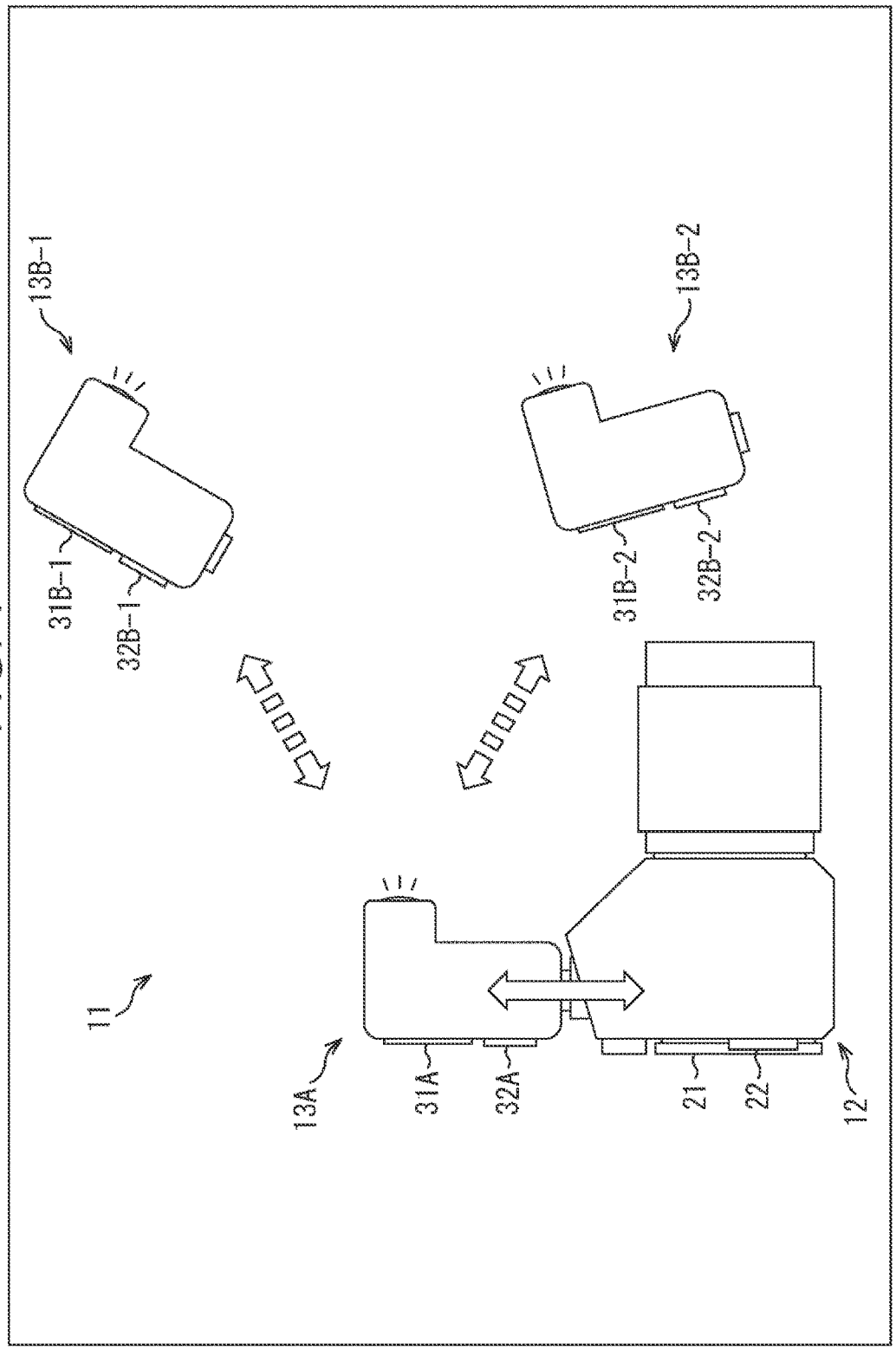
FIG. 1 is a diagram illustrating a configuration example of an embodiment of an imaging system to which the present technology is applied.

FIG. 1 is a diagram illustrating a configuration example of an embodiment of an imaging system to which the present technology is applied.

As illustrated in FIG. 1, an imaging system 11 includes a camera body 12, an external flash 13A mounted on the camera body 12, and external flashes 13B-1 and 13B-2 not mounted on the camera body 12. Note that the external flashes 13B-1 and 13B-2 are also configured to be mountable to the camera body 12, and in a case where it is not necessary to distinguish the external flash 13A and the external flashes 13B-1 and 13B-2, they each are simply referred to as an external flash 13 hereinafter, as appropriate.

The camera body 12 includes a display unit 21 and an operation unit 22. On the display unit 21, an image captured by the camera body 12, various setting screens, and the like are displayed. The operation unit 22 is provided with a shutter button operated when imaging is performed by the camera body 12, a setting button operated when various settings are made by using a setting screen displayed on the display unit 21, and the like.

The external flash 13 includes a display unit 31 and an operation unit 32. On the display unit 31, a setting screen for performing setting for the external flash 13 is displayed. The operation unit 32 is provided with a setting button to be operated when the setting for the external flash 13 is performed by using the setting screen displayed on the display unit 21.

Here, in the imaging system 11, the external flash 13A can communicate with the camera body 12 via an electrical contact of a mounting unit provided in the camera body 12. Meanwhile, in the imaging system 11, the external flashes 13B-1 and 13B-2 can communicate with the external flash 13A via wireless communication using radio waves. That is, the external flash 13A directly communicates with the camera body 12 to transmit a command to the external flashes 13B-1 and 13B-2, and the external flashes 13B-1 and 13B-2 can receive the command and operate.

Thus, hereinafter, the external flash 13A is also referred to as a commander 13A, and the external flashes 13B-1 and 13B-2 are also referred to as receivers 13B-1 and 13B-2, as appropriate.

Figure 2:
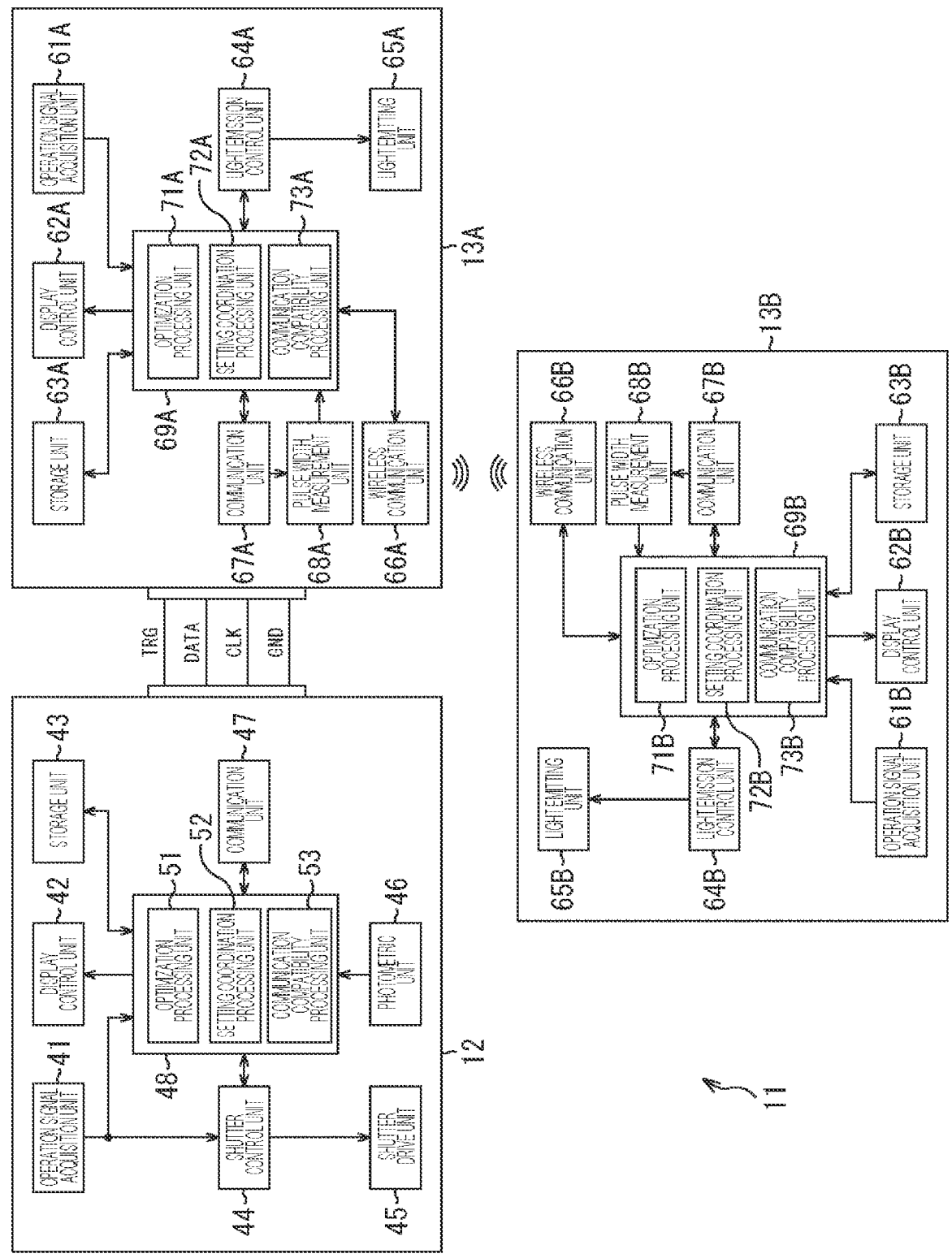
FIG. 2 is a block diagram illustrating a functional configuration example of the imaging system.

FIG. 2 is a block diagram illustrating a functional configuration example of the imaging system 11.

As illustrated in FIG. 2, in the imaging system 11, when the commander 13A is mounted on the camera body 12, the camera body 12 and the commander 13A are electrically connected together via four signal lines (TRG, DATA, CLK, GND), and communication can be performed. Furthermore, the commander 13A and a receiver 13B can perform communication by wireless communication.

The camera body 12 includes an operation signal acquisition unit 41, a display control unit 42, a storage unit 43, a shutter control unit 44, a shutter drive unit 45, a photometric unit 46, a communication unit 47, and a control unit 48.

When an operation on the operation unit 22 of FIG. 1 is performed, the operation signal acquisition unit 41 acquires an operation signal depending on the operation. For example, when an operation of fully pressing the shutter button of the operation unit 22 is performed, the operation signal acquisition unit 41 acquires an operation signal indicating that the shutter button is fully pressed, and supplies the operation signal to the shutter control unit 44 and the control unit 48. Furthermore, when an operation on the setting button of the operation unit 22 is performed, the operation signal acquisition unit 41 acquires an operation signal indicating that an instruction is given for making a setting associated with the setting button, and supplies the operation signal to a setting coordination processing unit 52 of the control unit 48.

The display control unit 42 controls display on the display unit 21 of FIG. 1, and can control display or non-display of the setting screen of the external flash 13 in accordance with, for example, setting coordination processing by the setting coordination processing unit 52 of the control unit 48.

The storage unit 43 stores various data necessary for control of the camera body 12 by the control unit 48. For example, the storage unit 43 can store setting information of the commander 13A acquired by the communication unit 47 communicating with the commander 13A, setting information of the receiver 13B acquired via the commander 13A, and the like. Here, various setting values such as a light emission mode and a light distribution type of the external flash 13, brightness of AF assist light, the number of times of test light emission, and the like are registered in the setting information of the external flash 13.

For example, when the operation signal indicating that the shutter button is fully pressed is supplied from the operation signal acquisition unit 41, the shutter control unit 44 performs control for the shutter drive unit 45 so that an imaging element (not illustrated) is exposed for an appropriate exposure time. At this time, the shutter control unit 44 can control a timing of exposing the imaging element, and the like in accordance with optimization processing by an optimization processing unit 51 of the control unit 48.

The shutter drive unit 45 drives a front curtain and a rear curtain (both are not illustrated) for adjusting the exposure time of the imaging element in accordance with control by the shutter control unit 44.

The photometric unit 46 includes, for example, an optical sensor or the like, measures an amount of light emitted to a subject by light emission of the external flash 13, and supplies a photometry result obtained by the measurement to the optimization processing unit 51 of the control unit 48.

The communication unit 47 communicates with the commander 13A via the four signal lines (TRG, DATA, CLK, GND) in accordance with control by the control unit 48. Here, in the imaging system 11, the communication unit 47 is assumed to perform communication according to two communication standards of a first communication standard and a second communication standard, and can perform communication by causing these communication standards to transition in accordance with communication compatibility processing by a communication compatibility processing unit 53 of the control unit 48. Note that, the second communication standard is compatible with the first communication standard, and a device supporting the second communication standard can perform communication according to the first communication standard. On the other hand, a device that supports only the first communication standard cannot perform communication according to the second communication standard.

The control unit 48 performs control necessary for performing imaging by the camera body 12. Furthermore, as illustrated, the control unit 48 includes the optimization processing unit 51, the setting coordination processing unit 52, and the communication compatibility processing unit 53.

For example, the optimization processing unit 51 recognizes a light emission preparation time of each of the external flashes 13 constituting the imaging system 11, and executes the optimization processing necessary for optimizing a release time lag as the entire imaging system 11. Here, the light emission preparation time indicates a time from when the external flash 13 receives an instruction for light emission to when a light emission trigger can be received, and the release time lag indicates a time from the operation of fully pressing the shutter button to when imaging is actually performed. As described above, the optimization processing unit 51 executes the optimization processing, whereby making the release time lag shorter or constant can be achieved in the imaging system 11.

For example, the setting coordination processing unit 52 executes the setting coordination processing necessary for coordinating settings by respective operations in a case where an operation for performing setting for the external flash 13 is performed on the camera body 12 and in a case where the operation is performed on the external flash 13. As described above, the setting coordination processing unit 52 executes the setting coordination processing, whereby the setting for the external flash 13 can be implemented by the operation on the camera body 12 in the imaging system 11.

For example, in a case where it is assumed that the external flash 13 supporting the second communication standard and the external flash 13 supporting the first communication standard are mixed, the communication compatibility processing unit 53 executes the communication compatibility processing necessary for maintaining communication compatibility. As described above, the communication compatibility processing unit 53 executes the communication compatibility processing, whereby it is possible to cope with various cases in which the first communication standard and the second communication standard are assumed to be mixed, in the imaging system 11.

The commander 13A includes an operation signal acquisition unit 61A, a display control unit 62A, a storage unit 63A, a light emission control unit 64A, a light emitting unit 65A, a wireless communication unit 66A, a communication unit 67A, a pulse width measurement unit 68A, and a control unit 69A. Note that the receiver 13B is configured similarly to the commander 13A, and here, a configuration of the commander 13A will be described, and description of a configuration of the receiver 13B will be omitted.

When an operation on an operation unit 32A of FIG. 1 is performed, the operation signal acquisition unit 61A acquires an operation signal depending on the operation. For example, when an operation on the setting button of the operation unit 32A is performed, the operation signal acquisition unit 61A acquires an operation signal indicating that an instruction is given for making a setting associated with the setting button, and supplies the operation signal to the control unit 69A.

The display control unit 62A performs control to cause a display unit 31A of FIG. 1 to display a setting screen in accordance with control by the control unit 69A.

The storage unit 63A stores various data necessary for control of the commander 13A by the control unit 69A, setting information set in the commander 13A, and the like.

The light emission control unit 64A controls light emission of the light emitting unit 65A in accordance with a light emission trigger output from the camera body 12 in response to a full-press operation on the shutter button.

The light emitting unit 65A emits light in accordance with control by the light emission control unit 64A.

The wireless communication unit 66A performs wireless communication with a wireless communication unit 66B of the receiver 13B in accordance with control by the control unit 69A.

The communication unit 67A communicates with the camera body 12 via the four signal lines (TRG, DATA, CLK, GND) in accordance with control by the control unit 69A. Here, in the imaging system 11, the communication unit 67A is assumed to perform communication according to two communication standards of the first communication standard and the second communication standard.

The pulse width measurement unit 68A measures a pulse width of a signal transmitted at a predetermined clock cycle via the signal line CLK. Then, when a pulse width larger than a pulse width normally used in the second communication standard is measured, the pulse width measurement unit 68A detects that a cancellation signal that gives an instruction for canceling communication at that time is output from the camera body 12, and supplies a cancellation detection signal indicating the fact to an optimization processing unit 71A of the control unit 69A.

The control unit 69A performs control necessary for the commander 13A to emit light in synchronization with imaging by the camera body 12. Furthermore, as illustrated, the control unit 69A includes the optimization processing unit 71A, a setting coordination processing unit 72A, and a communication compatibility processing unit 73A.

The optimization processing unit 71A executes the optimization processing with the optimization processing unit 51 of the camera body 12.

The setting coordination processing unit 72A executes the setting coordination processing with the setting coordination processing unit 52 of the camera body 12.

The communication compatibility processing unit 73A executes the communication compatibility processing with the communication compatibility processing unit 53 of the camera body 12.

The imaging system 11 configured as described above can implement setting for the external flash 13 by the operation on the camera body 12.

<Display Example of Setting Screen>

With reference to FIGS. 3A, 3B, 4A, 4B, 5A, 5B, 6A, 6B, 7A, 7B, 8, 9, and 10, a description will be given of a setting screen displayed on the display unit 21 of the camera body 12 and a setting screen displayed on the display unit 31 of the external flash 13.

Conventionally, in a configuration in which communication according to the first communication standard is performed between the camera body 12 and the external flash 13, setting for the external flash 13 has been performed by displaying a setting screen on the display unit 31 of the external flash 13 and operation on the operation unit 32 of the external flash 13.

On the other hand, in the imaging system 11, the setting information is transmitted and received by communication according to the second communication standard, whereby the setting for the external flash 13 can be performed by displaying the setting screen on the display unit 21 of the camera body 12 and by an operation on the operation unit 22 of the camera body 12. Thus, in the imaging system 11, a common setting screen used to set the same setting item is displayed on each of the display unit 31 of the external flash 13 and the display unit 21 of the camera body 12.

Figure 3A:
FIGS. 3A and 3B are diagrams illustrating a display example of a setting screen displayed corresponding to each of a camera body and an external flash.
Figure 3B:

For example, a display example of the setting screen displayed on the display unit 31 of the external flash 13 is illustrated on the left side of FIGS. 3A and 3B, and a display example of the setting screen displayed on the display unit 21 of the camera body 12 is illustrated on the right side of FIGS. 3A and 3B. Furthermore, the setting screen illustrated in FIG. 3A is used to set the light emission mode of the external flash 13, and the setting screen illustrated in FIG. 3B is used to perform custom setting for the external flash 13.

As described above, the imaging system 11 can transmit the setting information set for the external flash 13 to the camera body 12 by communication according to the second communication standard, and can cause the display unit 21 of the camera body 12 to display the setting screen for setting the external flash 13. Thus, a user can perform setting for the external flash 13 by performing the operation on the operation unit 22 of the camera body 12 while viewing the setting screen displayed on the display unit 21 of the camera body 12.

Figure 4A:
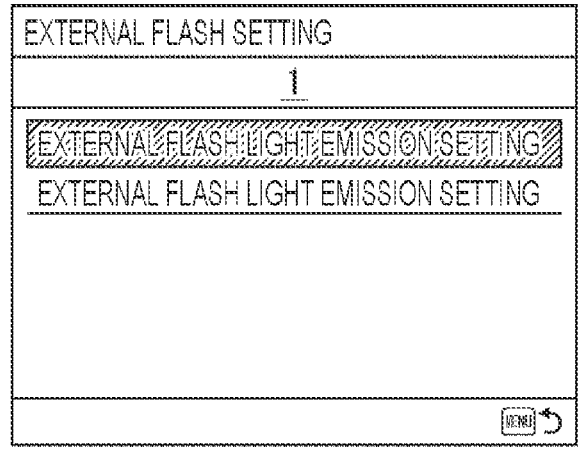
FIGS. 4A and 4B are diagrams explaining an invalid state of a setting item on a setting screen.
Figure 4B:
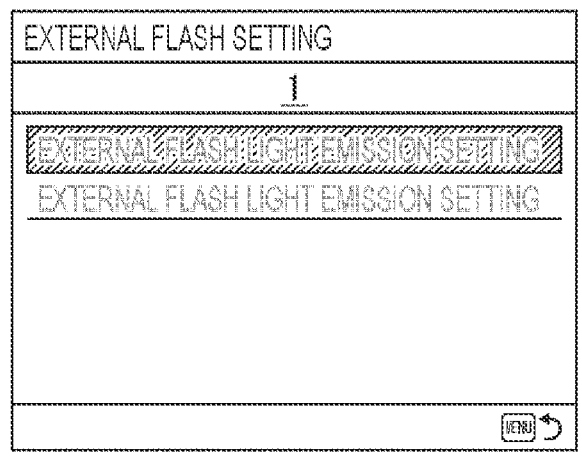

With reference to FIGS. 4A and 4B, a description will be given of an invalid state of the setting item on the setting screen displayed on the display unit 21 of the camera body 12.

For example, in the imaging system 11, when the external flash 13 supporting the second communication standard is mounted on the camera body 12, a setting screen on which it can be confirmed that the setting item is in a valid state (that is, a state in which setting for the setting item is possible) is displayed. On the other hand, in the imaging system 11, when the external flash 13 is not mounted on the camera body 12 or when the external flash 13 not supporting the second communication standard is mounted on the camera body 12, a setting screen on which it can be confirmed that the setting item is in the invalid state (that is, a state in which setting for the setting item is impossible) is displayed.

For example, FIG. 4A illustrates a display example of the setting screen displayed on the display unit 21 of the camera body 12 when the external flash 13 supporting the second communication standard is mounted on the camera body 12. At this time, as illustrated, the setting item is displayed in black on the setting screen to indicate that the setting item is in the valid state.

On the other hand, FIG. 4B illustrates a display example of the setting screen displayed on the display unit 21 of the camera body 12 when the external flash 13 is not mounted on the camera body 12 or when the external flash 13 not supporting the second communication standard is mounted on the camera body 12. At this time, as illustrated, the setting item is displayed in gray (grayed-out) on the setting screen to indicate that the setting item is in the invalid state.

As described above, the imaging system 11 recognizes whether or not the external flash 13 connected to the camera body 12 can be set by the operation on the operation unit 22 of the camera body 12 depending on whether or not the external flash 13 supports the second communication standard, and can display the setting screen on which it can be confirmed that the setting item is in the valid state or the invalid state. Thus, in a case where the setting item is in the valid state, the user can easily recognize that the setting of the external flash 13 connected to the camera body 12 can be performed by the operation on the operation unit 22 of the camera body 12.

With reference to FIGS. 5A and 5B, a description will be given of display or non-display of the setting item on the setting screen displayed on the display unit 21 of the camera body 12.

For example, in the imaging system 11, when the external flash 13 supporting the second communication standard is mounted on the camera body 12, a setting screen on which only a setting item corresponding to a function of an individual external flash 13 is displayed, is displayed on the display unit 21 of the camera body 12. That is, in the imaging system 11, the setting item on the setting screen is displayed or hidden depending on the function of the external flash 13 mounted on the camera body 12.

For example, FIG. 5A illustrates a display example of the setting screen displayed on the display unit 21 of the camera body 12 when the external flash 13 is mounted having a function supporting custom setting of a flash light distribution type, registration, AF assist light brightness, charge setting, test light emission, and TTL light amount memory. At this time, as illustrated, the flash light distribution type, registration, AF assist light brightness, charge setting, test light emission, and TTL light amount memory are displayed as setting items on the setting screen.

Furthermore, FIG. 5B illustrates a display example of the setting screen displayed on the display unit 21 of the camera body 12 when the external flash 13 is mounted having a function supporting custom setting of flash light distribution type, registration, AF assist light brightness, and test light emission. At this time, as illustrated, the flash light distribution type, registration, AF assist light brightness, and test light emission are displayed as setting items on the setting screen. That is, at this time, setting items corresponding to functions (for example, custom setting for charge setting, TTL light amount memory, or the like) that the external flash 13 mounted on the camera body 12 does not have are hidden.

As described above, the imaging system 11 can transmit the setting information set in the external flash 13 to the camera body 12 by communication according to the second communication standard, and can display the setting screen of only the setting item corresponding to the function of the external flash 13 mounted on the camera body 12. Thus, the user can easily set the external flash 13 mounted on the camera body 12.

Figure 6A:
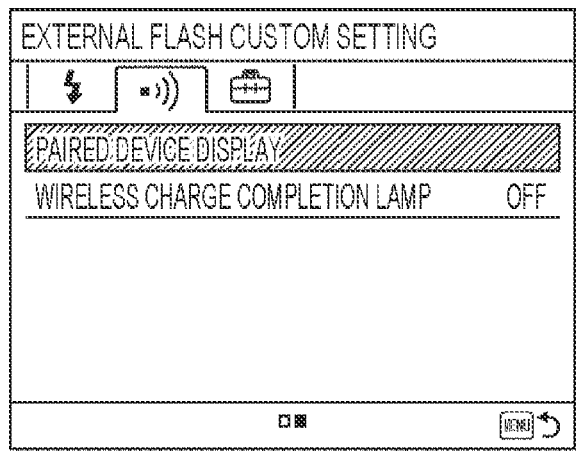
FIGS. 6A and 6B are diagrams explaining an unsettable state of the setting item of the external flash.
Figure 6B:
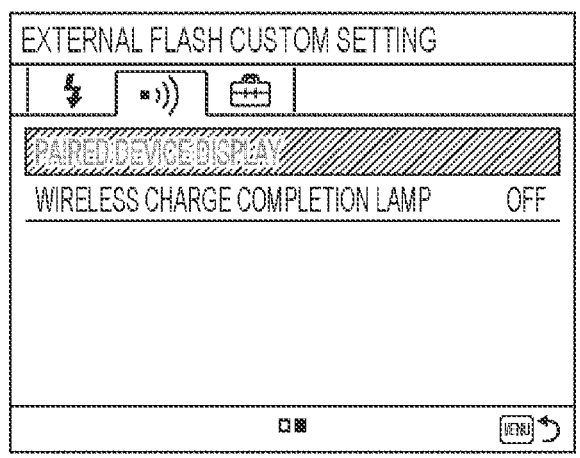

With reference to FIGS. 6A and 6B, a description will be given of an unsettable state of the setting item of the external flash 13 on the setting screen displayed on the display unit 21 of the camera body 12.

For example, in the imaging system 11, it is possible to transmit a setting item and an item value set in external flash 13, whether or not the item value can be selected, a current setting value, and the like from the external flash 13 to the camera body 12 by communication according to the second communication standard. As a result, in the imaging system 11, the setting information of the external flash 13 mounted on the camera body 12 is displayed on the display unit 21 of the camera body 12, the setting of the external flash 13 can be changed, and a setting item in the unsettable state can be grayed out depending on the setting.

Then, on the camera body 12 side, a setting item in a settable state can be displayed in black on the setting screen, while a setting item in the unsettable state can be displayed in grayed-out on the setting screen. That is, in the imaging system 11, in a case where a setting item is changed from the settable state to the unsettable state in accordance with a current setting value of the external flash 13, the setting item is changed from black to grayed-out, and it can be indicated that the setting item is changed to the unsettable state.

For example, a display example of the setting screen illustrated in A of FIG. 6A indicates that a setting item of paired device display is in the settable state, and a display example of the setting screen illustrated in FIG. 6B indicates that the setting item of paired device display is in the unsettable state.

As described above, in the imaging system 11, the camera body 12 can recognize whether the setting item of the external flash 13 is in the settable state or the unsettable state by communication according to the second communication standard, and display the setting screen in which the unsettable state is grayed out. Thus, regarding a setting item displayed in the grayed-out state, the user can easily recognize that the setting item is in the unsettable state.

Furthermore, the external flash 13 collectively transmits a plurality of setting items that can be set in the external flash 13 only once at a timing when the external flash 13 is mounted on the camera body 12 or at a timing when power of the camera body 12 is turned on, whereby the camera body 12 can cope with, for example, a model difference of the external flash 13 even if there is the model difference, and setting response can be improved.

Figure 7A:
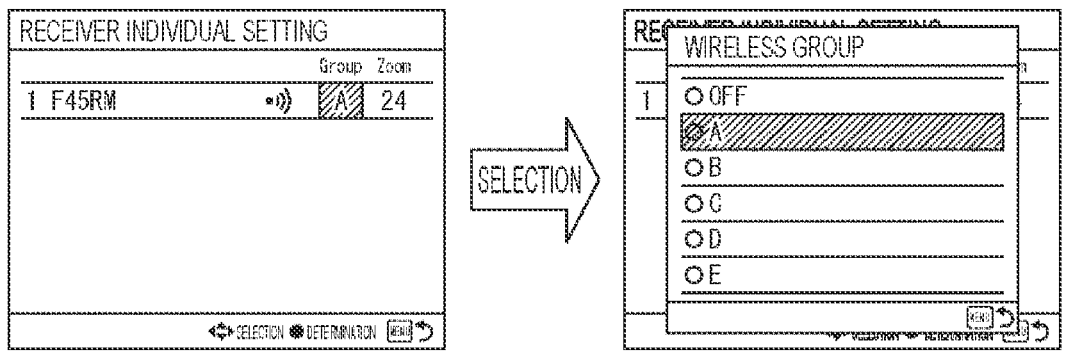
FIGS. 7A and 7B are diagrams explaining an unsettable state of a setting item of a receiver.
Figure 7B:
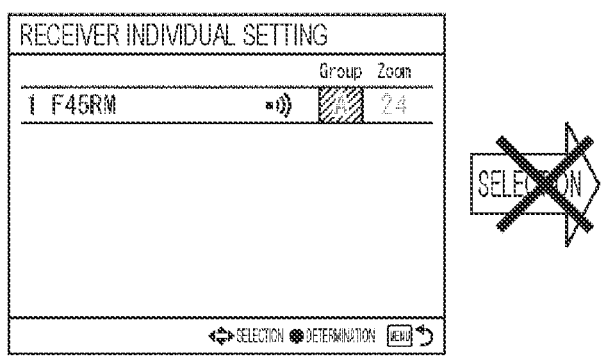

With reference to FIGS. 7A and 7B, a description will be given of an unsettable state of the setting item of the receiver 13B on the setting screen displayed on the display unit 21 of the camera body 12.

For example, in the imaging system 11, the commander 13A mounted on the camera body 12 can acquire a setting item and an item value set in the receiver 13B, whether or not the item value can be selected, a current setting value, and the like by wireless communication, and transmit them to the camera body 12 by communication according to the second communication standard. As a result, in the imaging system 11, the setting information of the receiver 13B is displayed on the display unit 21 of the camera body 12, and the setting item in the unsettable state can be grayed out depending on the setting. Moreover, in the imaging system 11, the setting of the receiver 13B can be changed by transmitting selection and operation confirmation on the camera body 12 side to the receiver 13B via the commander 13A.

Then, on the camera body 12 side, a setting item in a settable state can be displayed in black on the setting screen, while a setting item in the unsettable state can be displayed in grayed-out on the setting screen. That is, in the imaging system 11, in a case where a setting item is changed from the settable state to the unsettable state in accordance with the current setting value of the receiver 13B, the setting item is changed from black to grayed-out, and it can be indicated that the setting item is changed to the unsettable state.

For example, a display example of the setting screen illustrated in FIG. 7A indicates that a setting item of a wireless group is in the settable state, and indicates that a setting screen for selecting the wireless group is displayed by selecting the setting item. On the other hand, a display example of the setting screen illustrated in FIG. 7B indicates that the setting item of the wireless group is in the unsettable state, and indicates that the setting screen is not displayed even if an operation to select the setting item is performed.

As described above, in the imaging system 11, the camera body 12 recognizes whether the setting item of the receiver 13B is in the settable state or the unsettable state by communication according to the second communication standard, and can display the setting screen in which the unsettable state is grayed out. Thus, regarding a setting item displayed in the grayed-out state, the user can easily recognize that the setting item is in the unsettable state. Note that, in addition to displaying the unsettable state in grayed-out, by changing a display mode by changing color or adding an icon, for example, the settable state or the unsettable state may become recognizable.

Furthermore, in the imaging system 11, the setting value can be reliably reflected by transmitting and receiving, to and from the camera body 12 via the commander 13A, information indicating whether the setting on the receiver 13B side is reflected. Furthermore, the receiver 13B can reduce an amount of transmission data and improve the setting response by collecting data of the plurality of setting items into one piece of setting information and transmitting the setting information to the camera body 12 via the commander 13A.

Figure 8:
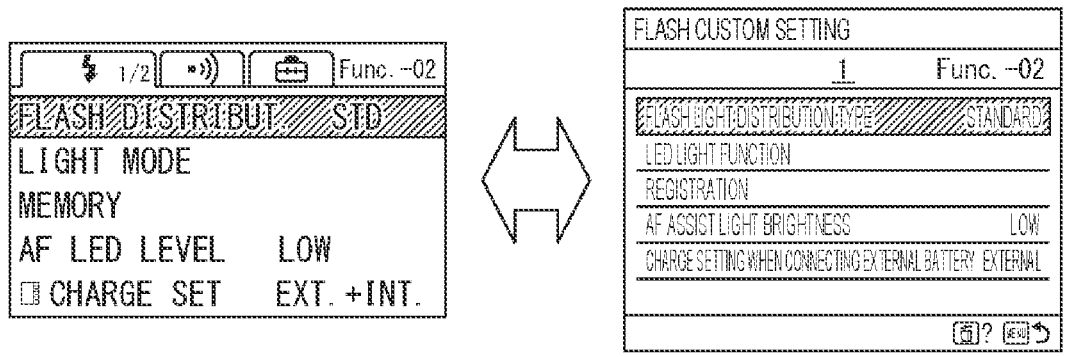
FIG. 8 is a diagram explaining a unique ID displayed on a setting screen.

With reference to FIG. 8, a description will be given of a unique ID displayed on a setting screen.

As described above, in the imaging system 11, a common setting screen used to set the same setting item is displayed on each of the display unit 31 of the external flash 13 and the display unit 21 of the camera body 12. Meanwhile, in the camera body 12 and the external flash 13, setting screens can be displayed in the same notation (for example, both of the setting screens are in English), but the setting screens may be displayed in different notations depending on the display performance of each. For example, it is considered preferable that the setting screen in English is used in the external flash 13 as in the conventional one, and the setting screen in multi-language in which the function name is easily understood is used in the camera body 12.

As described above, in a case where the setting screens of the same setting item are displayed in different notations in the camera body 12 and the external flash 13, it is assumed that it is difficult to recognize that they are common setting screens. Thus, in the imaging system 11, by displaying the unique ID unique to each setting screen, it is possible to easily recognize that the setting screen displayed on the display unit 31 of the external flash 13 and the setting screen displayed on the display unit 21 of the camera body 12 are common.

For example, the left side of FIG. 8 illustrates a display example of the setting screen in English displayed on the display unit 31 of the external flash 13, and the right side of FIG. 8 illustrates a display example of the setting screen in Japanese displayed on the display unit 21 of the camera body 12. Then, in each setting screen, a unique ID "Func.-02" unique to each setting screen is displayed in the upper right. Note that, instead of the unique ID, for example, a unique icon or the like may be displayed on each setting screen. Furthermore, content itself displayed on the display unit 31 of the external flash 13 may be displayed on the display unit 21 of the camera body 12 as "display on the flash side".

As described above, the imaging system 11 displays the unique ID unique to each setting screen, and thus, for example, even in a case where the common setting screens are displayed in different notations, the user can easily recognize that the setting screens are common. As a result, the user can satisfactorily perform setting of the external flash 13 by the operation on the operation unit 22 of the camera body 12.

Figure 9:
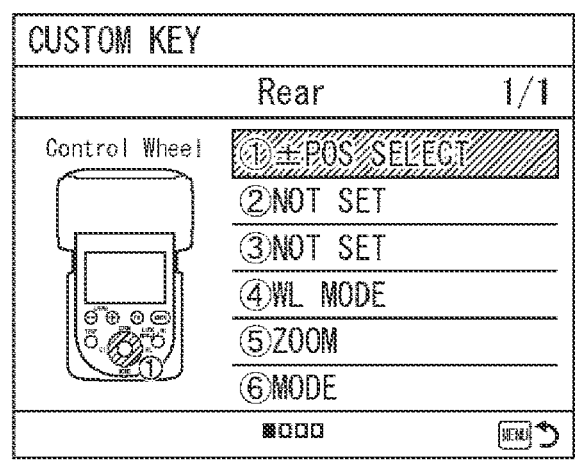
FIG. 9 is a diagram explaining a custom key setting screen.

With reference to FIG. 9, a description will be given of a custom key setting screen.

For example, in the imaging system 11, various functions can be assigned to setting buttons provided in the operation unit 32 of the external flash 13, and the setting can be performed in the camera body 12. Then, in the camera body 12, when a function is assigned to the setting button of the external flash 13, the custom key setting screen as illustrated in FIG. 9 is displayed on the display unit 21 of the camera body 12.

FIG. 9 illustrates a display example of the custom key setting screen for assigning a function to a setting button provided on the back surface side of the external flash 13.

As illustrated in FIG. 9, an image of the back surface of the external flash 13 is displayed on the left side of the custom key setting screen. Furthermore, on the right side of the custom key setting screen, a number assigned to each setting button as a setting item and setting content for each number are displayed. In the display example illustrated in FIG. 9, a state is illustrated in which a wheel hatched in the image of the back surface of the external flash 13 is selected as a target to which a function is to be assigned, and a number 1 is assigned to the wheel. Note that, the image of the back surface of the external flash 13 may be changed depending on the appearance of the external flash 13 to be connected.

By adopting such a custom key setting screen, in the imaging system 11, the setting button selected as the target to which the function is assigned can be confirmed with the image of the back surface of the external flash 13. As a result, the user can easily grasp which setting button the function is assigned to, and can satisfactorily perform setting of the external flash 13 by the operation on the operation unit 22 of the camera body 12.

Figure 10:
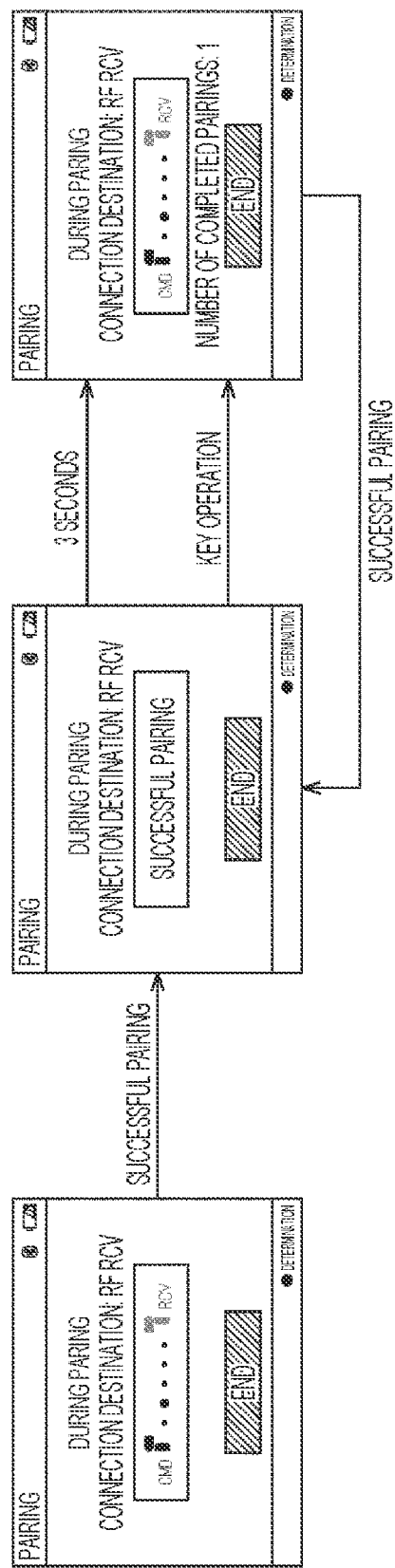
FIG. 10 is a diagram explaining a setting screen during pairing.

With reference to FIG. 10, a description will be given of a setting screen during pairing.

For example, in the imaging system 11, the camera body 12 can be operated to execute pairing for performing authentication and establishing communication between the commander 13A and the receiver 13B. Then, while the commander 13A performs pairing with the receiver 13B, a setting screen indicating that pairing is being performed is displayed on the display unit 21 of the camera body 12.

That is, as illustrated on the left side of FIG. 10, animation display indicating that pairing is being performed (for example, a moving display in which information is transmitted from the commander 13A to the receiver 13B) is performed on the setting screen displayed on the display unit 21 of the camera body 12 while the commander 13A performs pairing with the receiver 13B. Thereafter, when the commander 13A succeeds in pairing with the receiver 13B, a message "successful pairing" is displayed instead of the animation display as illustrated in the center of FIG. 10.

Here, in the imaging system 11, the commander 13A is configured to perform pairing with a plurality of the receivers 13B. Thus, when pairing with the first receiver 13B is successful, the commander 13A executes pairing with the second receiver 13B after a predetermined time (for example, 3 seconds) has elapsed or in response to a key operation by the user.

As described above, while the commander 13A executes pairing with the second receiver 13B, animation display indicating that pairing is being performed is performed on the setting screen displayed on the display unit 21 of the camera body 12 as illustrated on the right side of FIG. 10. At this time, a count value "number of completed pairings: 1" indicating that pairing with the first receiver 13B has already been completed is displayed on the setting screen.

Thereafter, when the commander 13A succeeds in pairing with the second receiver 13B, the message "successful pairing" is displayed instead of the animation display as illustrated in the center of FIG. 10. Thereafter, similarly, pairing with the plurality of receivers 13B constituting the imaging system 11 is repeatedly performed, and the count value displayed on the setting screen illustrated on the right side of FIG. 10 is counted up and displayed each time pairing succeeds. Then, after pairing with all the receivers 13B constituting the imaging system 11 is successful, pairing processing is ended in response to the user's operation.

As described above, while the commander 13A performs pairing with the receiver 13B, the imaging system 11 displays the setting screen for performing animation display indicating that pairing is being performed on the display unit 21 of the camera body 12, whereby the user can reliably recognize that pairing is being performed. Furthermore, the count value displayed on the setting screen is counted up each time pairing succeeds, whereby the user can grasp progress of pairing.

<Processing Example of Setting Coordination Processing>

The setting coordination processing in the imaging system 11 will be described with reference to flowcharts illustrated in FIGS. 11 to 14.

Figure 11:
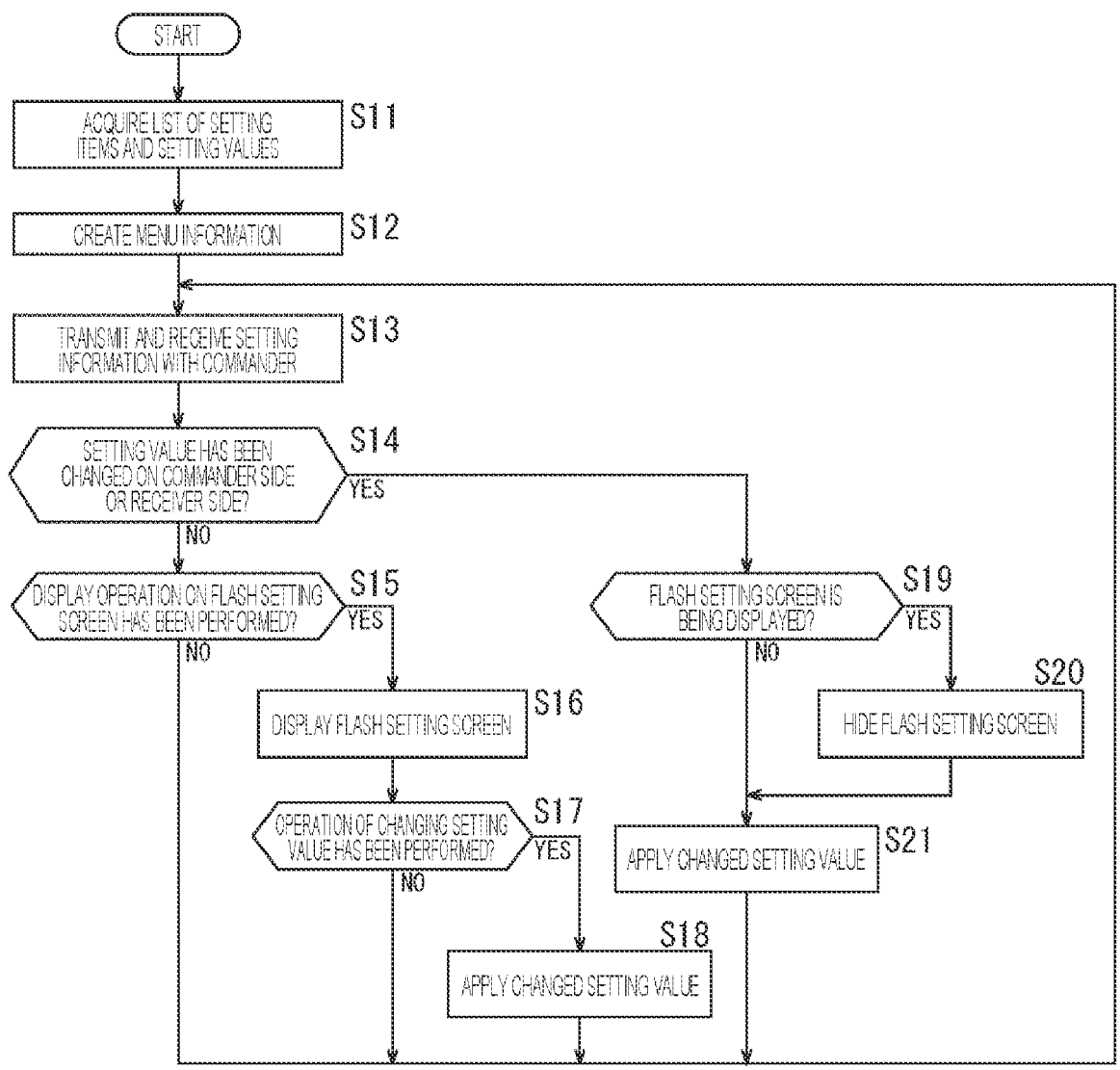
FIG. 11 is a flowchart explaining setting coordination processing of the camera body.

FIG. 11 illustrates a flowchart explaining the setting coordination processing executed by the setting coordination processing unit 52 of the camera body 12.

For example, when the commander 13A is connected to the camera body 12 or when power of the commander 13A connected to the camera body 12 is turned on, the processing is started. In step S11, the setting coordination processing unit 52 transmits a command for requesting a list of setting items that can be set by the commander 13A and the receiver 13B and setting values registered for respective setting items by communication according to the second communication standard via the communication unit 47. Then, the setting coordination processing unit 52 receives and acquires the list of the setting items and setting values of the commander 13A and the receiver 13B transmitted in response to the command.

In step S12, the setting coordination processing unit 52 creates menu information to be display content of the setting screen for setting the external flash 13 in accordance with the list of the setting items and the setting values acquired in step S11.

In step S13, the setting coordination processing unit 52 performs transmission and reception of the setting information with the commander 13A by communication according to the second communication standard via the communication unit 47. That is, the setting information set in the camera body 12 is transmitted to the commander 13A, and the setting information of the commander 13A and the receiver 13B transmitted from the commander 13A is received.

In step S14, the setting coordination processing unit 52 determines whether or not a setting value has been changed in the commander 13A or the receiver 13B on the basis of the setting information received in step S13. For example, in a case where the setting value has been changed in the commander 13A or the receiver 13B, notification of information indicating that the setting value has been changed is performed from the commander 13A to the camera body 12, and the setting coordination processing unit 52 can determine that the setting value has been changed on the basis of the notification. Note that, for example, the setting coordination processing unit 52 may determine that the setting value has been changed in a case where the setting information is different from the previous setting information in the transmission and reception of the setting information performed periodically.

In step S14, in a case where the setting coordination processing unit 52 determines that the setting value has not been changed, the processing proceeds to step S15.

In step S15, the setting coordination processing unit 52 determines whether or not an operation on the operation unit 22 of the camera body 12 has been performed and a display operation for displaying the setting screen for setting the external flash 13 has been performed. Note that, when the setting screen for setting the external flash 13 is already displayed when determination in step S15 is made, the processing in steps S15 and S16 is skipped, and the processing proceeds to step S17.

In step S15, in a case where the setting coordination processing unit 52 determines that the display operation for displaying the setting screen for setting the external flash 13 has not been performed, the processing returns to step S13, and similar processing is repeatedly performed thereafter. On the other hand, in step S15, in a case where the setting coordination processing unit 52 determines that the display operation for displaying the setting screen for setting the external flash 13 has been performed, the processing proceeds to step S16.

In step S16, the setting coordination processing unit 52 gives an instruction to the display control unit 42 for controlling display of the setting screen based on the menu information created in step S12. In response to this, the display control unit 42 causes the display unit 21 of the camera body 12 to display the setting screen for setting the external flash 13. At this time, the display control unit 42 can display or hide the setting items, or gray out the setting items in the unsettable state, on the basis of the setting information.

In step S17, the setting coordination processing unit 52 determines whether or not an operation of changing a setting value of the external flash 13 has been performed on the basis of the operation signal supplied from the operation signal acquisition unit 41. For example, when the user operates the operation unit 22 of the camera body 12 to select a setting value of the external flash 13 and performs an operation of determining the selection, the setting coordination processing unit 52 determines that the operation of changing the setting value of the external flash 13 has been performed, and the processing proceeds to step S18.

In step S18, the setting coordination processing unit 52 performs processing of applying the changed setting value of the external flash 13. For example, the setting coordination processing unit 52 updates the changed setting value, and internal information of transmitting the fact that the setting value has been changed to the commander 13A.

After the processing of step S18, the processing returns to step S13. In this case, in step S13, the setting value of the external flash 13 changed in step S17 is transmitted to the commander 13A as the setting information, and thereafter, similar processing is repeatedly performed. Furthermore, in a case where it is determined in step S17 that the operation of changing the setting value has not been performed, the processing returns to step S13, and similar processing is repeatedly performed thereafter.

On the other hand, in step S14, in a case where the setting coordination processing unit 52 determines that the setting value has been changed, the processing proceeds to step S19.

In step S19, the setting coordination processing unit 52 determines whether or not the setting screen for setting the external flash 13 is being displayed on the display unit 21 of the camera body 12.

In step S19, in a case where the setting coordination processing unit 52 determines that the setting screen for setting the external flash 13 is being displayed on the display unit 21 of the camera body 12, the processing proceeds to step S20.

In step S20, the setting coordination processing unit 52 gives an instruction to the display control unit 42 for hiding the setting screen for setting the external flash 13. In response to this, the display control unit 42 puts the display unit 21 of the camera body 12 into a non-display state.

After the processing of step S20 or in a case where it is determined in step S19 that the setting screen for setting the external flash 13 is not being displayed, the processing proceeds to step S21.

In step S21, the setting coordination processing unit 52 performs processing of applying the changed setting value. For example, the setting coordination processing unit 52 updates the menu information with the changed setting value.

After the processing of step S21, the processing returns to step S13, and similar processing is repeated thereafter.

Here, in a case where a target for which it is determined in step S17 that the operation of changing the setting value of the external flash 13 has been performed is the receiver 13B, the changed setting value is transmitted from the camera body 12 to the commander 13A and further transmitted from the commander 13A to the receiver 13B by wireless communication, and the setting for the receiver 13B is applied.

Figure 12:
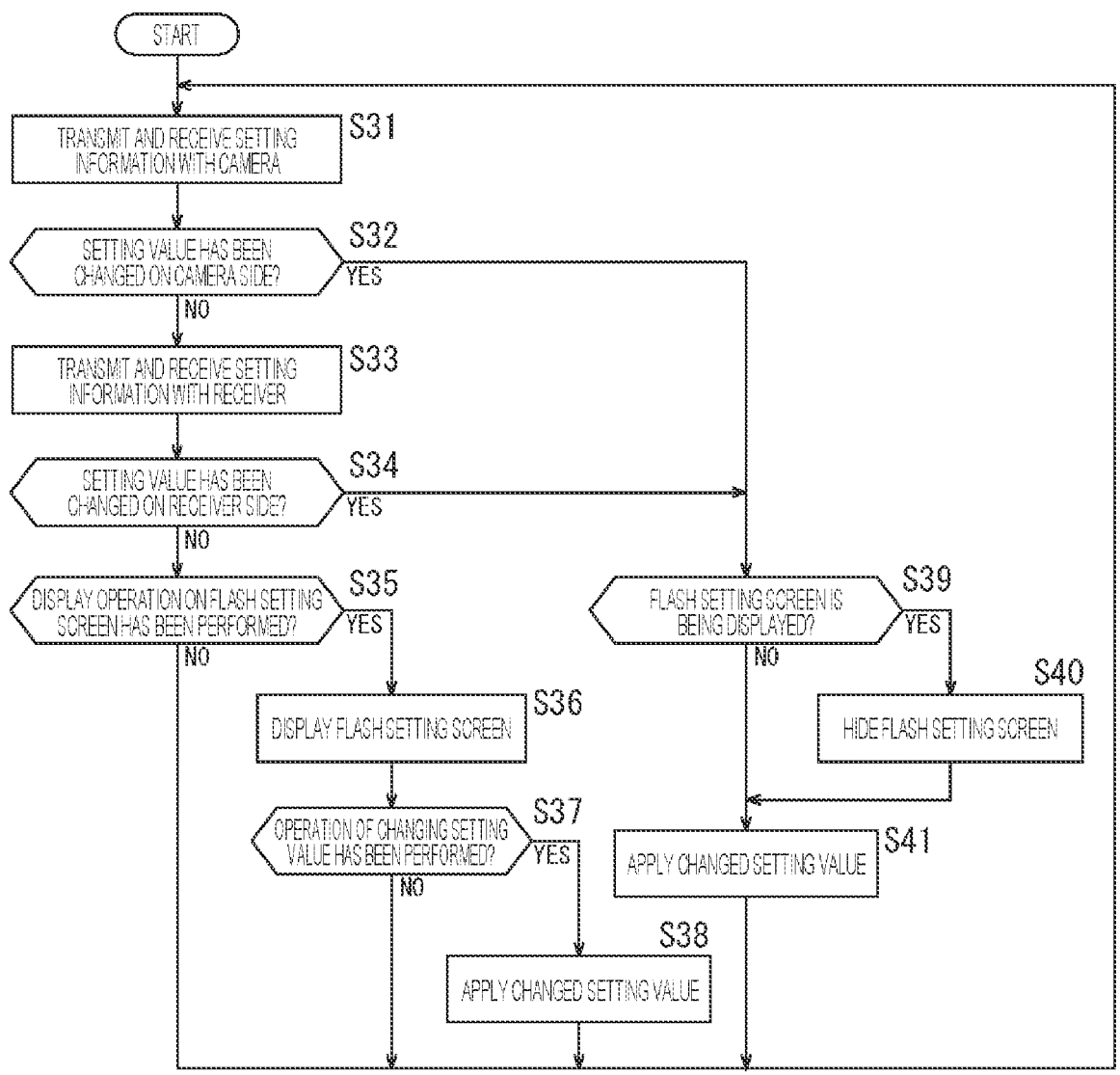
FIG. 12 is a flowchart explaining setting coordination processing of a commander.

FIG. 12 illustrates a flowchart explaining the setting coordination processing executed by the setting coordination processing unit 72A of the commander 13A.

For example, when the commander 13A is connected to the camera body 12 or when the power of the commander 13A connected to the camera body 12 is turned on, the processing is started, and in step S31, the setting coordination processing unit 72A performs transmission and reception of the setting information with the camera body 12 by communication according to the second communication standard via the communication unit 67A. That is, the setting information set in the commander 13A and the receiver 13B is transmitted to the camera body 12, and the setting information of the camera body 12 transmitted from the camera body 12 is received. Furthermore, when the setting value of the external flash 13 is changed in the camera body 12, the changed setting value is transmitted from the camera body 12 to the commander 13A.

In step S32, the setting coordination processing unit 72A determines whether or not the setting value of the external flash 13 has been changed in the camera body 12 on the basis of the setting information received in step S31. For example, in a case where the setting value has been changed in the camera body 12, notification of information indicating that the setting value has been changed is performed from the camera body 12 to the commander 13A, and the setting coordination processing unit 72A can determine that the setting value has been changed on the basis of the notification. Note that, for example, the setting coordination processing unit 72A may determine that the setting value of the external flash 13 has been changed in the camera body 12 in a case where the changed setting value of the external flash 13 has been transmitted in the transmission and reception of the setting information performed periodically.

In step S32, in a case where the setting coordination processing unit 72A determines that the setting value of the external flash 13 has not been changed in the camera body 12, the processing proceeds to step S33.

In step S33, the setting coordination processing unit 72A performs transmission and reception of the setting information with the receiver 13B by wireless communication via the wireless communication unit 66A. That is, when the setting information set in the receiver 13B is transmitted to the commander 13A and the setting value of the external flash 13 is changed in the camera body 12 or the commander 13A, the changed setting value is transmitted from the commander 13A to the receiver 13B.

In step S34, the setting coordination processing unit 72A determines whether or not the setting value has been changed in the receiver 13B on the basis of the setting information of the receiver 13B transmitted in step S33. For example, in a case where the setting value has been changed in the receiver 13B, notification of information indicating that the setting value has been changed is performed from the receiver 13B to the commander 13A, and the setting coordination processing unit 72A can determine that the setting value has been changed on the basis of the notification. Note that, for example, the setting coordination processing unit 72A may determine that the setting value has been changed in a case where the setting information is different from the previous setting information in the transmission and reception of the setting information performed periodically.

In step S34, in a case where the setting coordination processing unit 72A determines that the setting value has not been changed in the receiver 13B, the processing proceeds to step S35.

In step S35, the setting coordination processing unit 72A determines whether or not an operation on the operation unit 32A of the commander 13A has been performed and the display operation for displaying the setting screen for setting the external flash 13 has been performed. Note that, when the setting screen for setting the external flash 13 is already displayed when determination in step S35 is made, the processing in steps S35 and S36 is skipped, and the processing proceeds to step S37.

In step S35, in a case where the setting coordination processing unit 72A determines that the display operation for displaying the setting screen for setting the external flash 13 has not been performed, the processing returns to step S31, and similar processing is repeatedly performed thereafter. On the other hand, in step S35, in a case where the setting coordination processing unit 72A determines that the display operation for displaying the setting screen for setting the external flash 13 has been performed, the processing proceeds to step S36.

Then, in steps S36 to S41, processing similar to that performed in the camera body 12 in steps S16 to S21 of FIG. 11 is also performed in the commander 13A.

Figure 13:
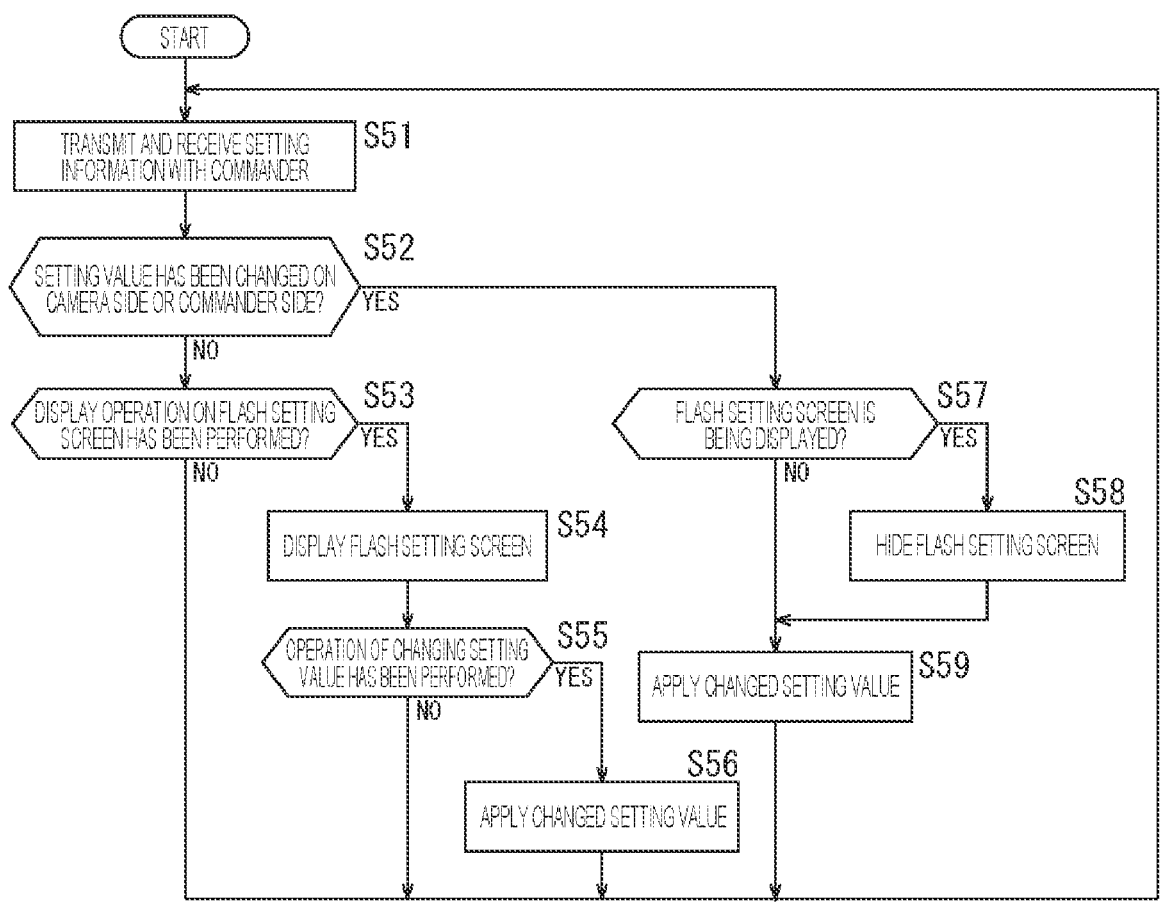
FIG. 13 is a flowchart illustrating setting coordination processing of the receiver.

FIG. 13 illustrates a flowchart explaining the setting coordination processing executed by a setting coordination processing unit 72B of the receiver 13B.

For example, when power of the receiver 13B is turned on and wireless communication with the commander 13A is established, the processing is started, and in step S51, the setting coordination processing unit 72B performs transmission and reception of the setting information with the commander 13A by wireless communication via the wireless communication unit 66B. That is, when the setting information set in the receiver 13B is transmitted to the commander 13A and the setting value of the external flash 13 is changed in the camera body 12 or the commander 13A, the changed setting value is transmitted from the commander 13A to the receiver 13B.

In step S52, the setting coordination processing unit 72B determines whether or not the setting value has been changed in the camera body 12 or the commander 13A on the basis of the setting information received in step S51. For example, in a case where the setting value has been changed in the camera body 12 or the commander 13A, notification of information indicating that the setting value has been changed is performed from the commander 13A to the receiver 13B, and the setting coordination processing unit 72B can determine that the setting value has been changed on the basis of the notification. Note that, for example, the setting coordination processing unit 72B may determine that the setting value has been changed in a case where the changed setting value has been received in the transmission and reception of the setting information performed periodically.

In steps S53 to S59, processing similar to that performed in the commander 13A in steps S35 to S41 in FIG. 12 is also performed in the receiver 13B.

Figure 14:
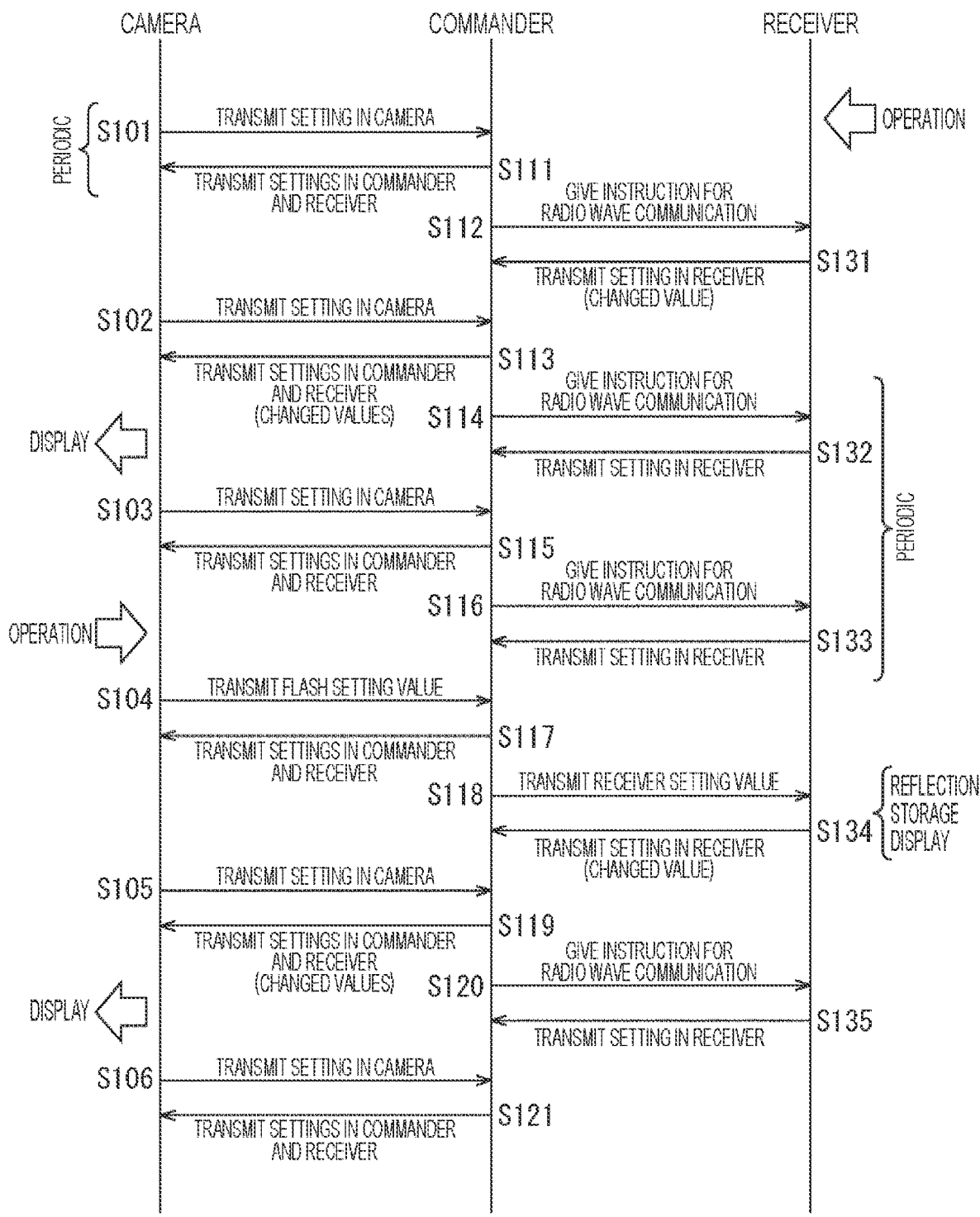
FIG. 14 is a diagram explaining a flow of processing in setting coordination processing.

With reference to FIG. 14, a flow of the processing in the setting coordination processing will be further described.

For example, between the camera body 12 and the commander 13A, transmission of the setting information set in the camera body 12 to the commander 13A (step S101 and the like) and transmission of the setting information set in the commander 13A and the receiver 13B to the camera body 12 (step S111 and the like) are performed periodically. Furthermore, between the commander 13A and the receiver 13B, an instruction is given for radio wave communication to the receiver 13B (step S114, S116, and the like) and transmission of the setting information set in the receiver 13B to the commander 13A (step S132, S133, and the like) are performed periodically.

Then, when a setting of the commander 13A is changed by the operation on the operation unit 22 of the camera body 12, a changed setting value thereof is transmitted (for example, step S104) from the camera body 12 to the commander 13A. As a result, in the commander 13A, the setting value changed in the camera body 12 is reflected, stored in the storage unit 63A, and displayed on the display unit 31A. On the other hand, in the camera body 12, the setting value is displayed on a setting screen for setting the commander 13A.

Furthermore, when a setting of the receiver 13B is changed by the operation on the operation unit 22 of the camera body 12, a changed setting value thereof is transmitted from the camera body 12 to the commander 13A (for example, step S104), and is transmitted from the commander 13A to the receiver 13B (for example, step S118). As a result, in the receiver 13B, the setting value changed in the camera body 12 is reflected, stored in a storage unit 63B, and displayed on a display unit 31B. Thereafter, the changed setting value is transmitted from the receiver 13B to the commander 13A (for example, step S134), and is transmitted from the commander 13A to the camera body 12 (for example, step S119). As a result, in the camera body 12, the changed setting value is displayed on a setting screen for setting the receiver 13B.

On the other hand, when a setting of the commander 13A is changed by the operation on the operation unit 32A of the commander 13A, a changed setting value thereof is reflected, stored in the storage unit 63A, and displayed on the display unit 31A. Thereafter, the changed setting value is transmitted from the commander 13A to the camera body 12 (for example, step S113), and the camera body 12 displays the changed setting value on the setting screen for setting the commander 13A.

Furthermore, when a setting of the receiver 13B is changed by an operation on an operation unit 32B of the receiver 13B, a changed setting value thereof is reflected, stored in the storage unit 63B, and displayed on the display unit 31B. Thereafter, the changed setting value is transmitted from the receiver 13B to the commander 13A (for example, step S131), and is transmitted from the commander 13A to the camera body 12 (for example, step S113). As a result, in the camera body 12, the changed setting value is displayed on a setting screen for setting the receiver 13B.

The setting coordination processing as described above is performed, whereby setting for the external flash 13 can be implemented by an operation on the camera body 12 side, in the imaging system 11. Furthermore, it is possible to cause the display unit 21 of the camera body 12 to display the setting changed in the external flash 13.

Note that, although the external flash 13 has been described in the present embodiment, the present technology is not limited to a flash light emitting device such as the external flash 13, and can be applied to other various external light emitting devices.

<Configuration Example of Computer>

Next, a series of processing steps (control method) described above can be performed by hardware or software. In a case where the series of processing steps is performed by software, a program constituting the software is installed in a general-purpose computer or the like.

Figure 15:
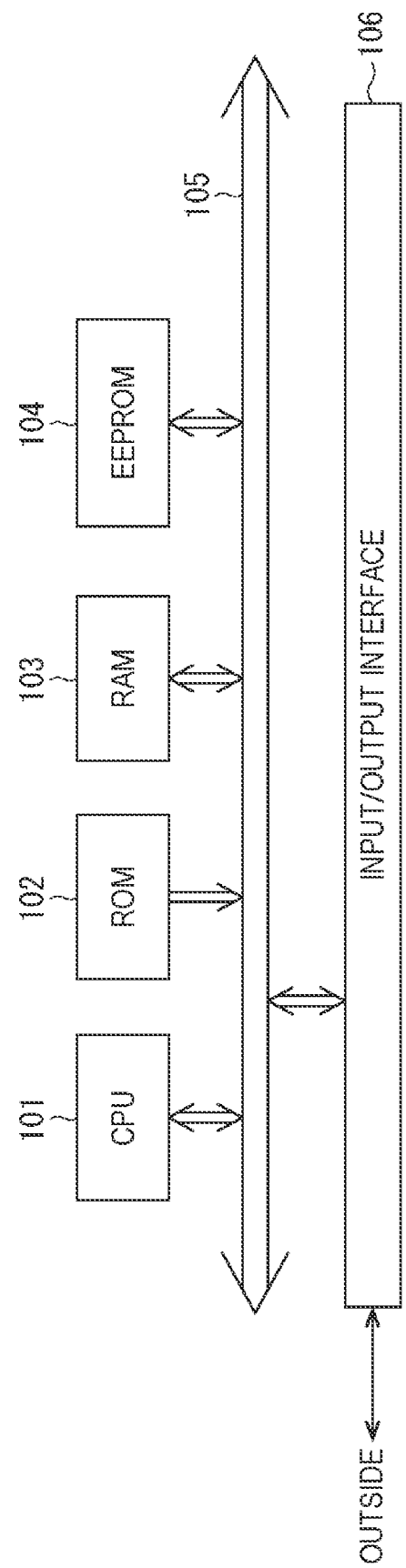
FIG. 15 is a block diagram illustrating a configuration example of an embodiment of a computer to which the present technology is applied.

FIG. 15 is a block diagram illustrating a configuration example of hardware of the computer that executes the above-described series of processing steps by the program.

In the computer, a central processing unit (CPU) 101, a read only memory (ROM) 102, a random access memory (RAM) 103, and an electronically erasable programmable read only memory (EEPROM) 104 are connected to each other by a bus 105. An input/output interface 106 is further connected to the bus 105, and the input/output interface 106 is connected to the outside.

In the computer configured as described above, for example, the CPU 101 loads the program stored in the ROM 102 and the EEPROM 104 to the RAM 103 via the bus 105 to execute the program, whereby the above-described series of processing steps. Furthermore, the program executed by the computer (CPU 101) can be written in the ROM 102 in advance, installed in the EEPROM 104 from the outside via the input/output interface 106, or updated.

Here, in the present specification, the processing performed by the computer in accordance with the program does not necessarily have to be performed chronologically in the order described as the flowchart. That is, the process performed by the computer in accordance with the program also includes processes executed in parallel or individually (for example, parallel process or process by an object).

Furthermore, the program may be processed by one computer (processor) or may be distributed and processed by a plurality of computers. Moreover, the program may be transferred to a remote computer and executed.

Moreover, in the present specification, a system means a set of a plurality of constituents (device, module (component), and the like), and it does not matter whether or not all of the constituents are in the same cabinet. Thus, a plurality of devices that is accommodated in a separate cabinet and connected to each other via a network and one device that accommodates a plurality of modules in one cabinet are both systems.

Furthermore, for example, the configuration described as one device (or processing unit) may be divided and configured as a plurality of devices (or processing units). Conversely, configurations described as a plurality of devices (or processing units) in the above may be collectively configured as one device (or processing unit). Furthermore, configurations other than those described above may be added to the configuration of each device (or each processing unit), of course. Moreover, as long as the configuration and operation of the system as a whole are substantially the same, a part of the configuration of a certain device (or processing unit) may be included in the configuration of another device (or another processing unit).

Furthermore, for example, the present technology can adopt a configuration of cloud computing that shares one function in a plurality of devices via a network to process in cooperation.

Furthermore, for example, the program described above can be executed in any device. In that case, it is sufficient that the device has a necessary function (functional block, or the like) and can obtain necessary information.

Furthermore, for example, each step described in the above flowchart can be executed by sharing in a plurality of devices, other than being executed by one device. Moreover, in a case where a plurality of pieces of processing is included in one step, the plurality of pieces of processing included in the one step can be executed by sharing in a plurality of devices, other than being executed by one device. In other words, a plurality of pieces of processing included in one step can be executed as processing of a plurality of steps. Conversely, processing described as a plurality of steps can be executed collectively as one step.

Note that, in the program executed by the computer, pieces of processing of steps describing the program may be executed in chronological order along with the order described in this specification, or in parallel, or may be individually executed at necessary timing such as when each step is called. That is, as long as inconsistency does not occur, the processing of each step may be executed in an order different from the order described above. Moreover, the processing of the step describing the program may be executed in parallel with processing of another program, or may be executed in combination with the processing of the other program.

Note that, as long as inconsistency does not occur, each of a plurality of the present technologies described in this specification can be implemented alone independently. Of course, it is also possible to implement by combining any of the plurality of present technologies. For example, a part or all of the present technology described in any of the embodiments can be implemented in combination with a part or all of the present technology described in other embodiments. Furthermore, a part or all of any of the present technologies described above can be implemented in combination with another technology not described above.

<Combination Example of Configurations>

Note that, the present technology can also be configured as described below.

(1)

An imaging system including:

an external flash including a first communication unit, a first display unit, and a first operation unit; and an imaging device including a second communication unit, a second display unit, and a second operation unit, in which setting coordination processing is executed, the setting coordination processing including:

transmitting and receiving setting information of the external flash between the first communication unit and the second communication unit;

causing the second display unit to display a setting screen to be used for setting a setting item of the external flash; and causing the setting information changed by an operation on the second operation unit to be transmitted from the imaging device to the external flash via the first communication unit and the second communication unit, to cause a setting for the external flash to be applied.

(2)
The imaging system according to (1), in which
on the setting screen displayed on the second display unit, the setting item is displayed or hidden depending on a function of the external flash.

(3)
The imaging system according to (1) or (2), in which
the first communication unit transmits a settable state or an unsettable state at present of the setting item set in the external flash to the imaging device, and
the second display unit performs display differently depending on whether the setting item is in the settable state or the unsettable state set in the external flash.

(4)
The imaging system according to claim 3, in which
the second display unit displays the setting item in the unsettable state in a grayed-out manner.
The imaging system according to (3).

(5)
The imaging system according to any of (1) to (4), in which
by the setting coordination processing, in a case where the setting information of the external flash is changed by an operation on the first operation unit, the setting screen being displayed on the second display unit is hidden.

(6)
The imaging system according to any of (1) to (5), in which
the external flash is connected to the imaging device, and another external flash that is not connected to the imaging device is further included,
the another external flash performs wireless communication with the external flash, and
setting coordination processing is executed, the setting coordination processing including:
transmitting and receiving setting information of the another external flash between the first communication unit and the second communication unit;
causing the second display unit to display a setting screen to be used for setting a setting item of the another external flash; and
causing the setting information changed by an operation on the second operation unit to be transmitted from the imaging device to the external flash via the first communication unit and the second communication unit, and further to be transmitted to the another external flash by wireless communication, to cause a setting for the another external flash to be applied.

(7)
The imaging system according to (6), in which
the first communication unit transmits a settable state or an unsettable state at present of the setting item set in the another external flash acquired by wireless communication to the imaging device, and
the second display unit performs display differently depending on whether the setting item is in the settable state or the unsettable state set in the another external flash.

(8)
The imaging system according to (7), in which
the second display unit displays the setting item in the unsettable state in a grayed-out manner.

(9)
The imaging system according to (6), in which
by the setting coordination processing, in a case where the setting information of the another external flash is changed by an operation on a third operation unit included in the another external flash, the setting screen being displayed on the second display unit is hidden.

(10)
The imaging system according to any of (1) to (9), in which
the first communication unit collectively transmits data of a plurality of the setting items as one piece of the setting information.

(11)
The imaging system according to (10), in which
a plurality of the setting items settable in the external flash is collectively transmitted once at a timing when the external flash is mounted on the imaging device or at a timing when power of the imaging device is turned on.

(12)
A control method including executing setting coordination processing,
by an imaging system including:
an external flash including a first communication unit, a first display unit, and a first operation unit; and
an imaging device including a second communication unit, a second display unit, and a second operation unit,
the setting coordination processing including:
transmitting and receiving setting information of the external flash between the first communication unit and the second communication unit;
causing the second display unit to display a setting screen to be used for setting a setting item of the external flash; and
causing the setting information changed by an operation on the second operation unit to be transmitted from the imaging device to the external flash via the first communication unit and the second communication unit, to cause a setting for the external flash to be applied.

(13)
A program for causing a computer of an imaging system to execute setting coordination processing,
the imaging system including:
an external flash including a first communication unit, a first display unit, and a first operation unit; and
an imaging device including a second communication unit, a second display unit, and a second operation unit,
the setting coordination processing including:
transmitting and receiving setting information of the external flash between the first communication unit and the second communication unit;
causing the second display unit to display a setting screen to be used for setting a setting item of the external flash; and
causing the setting information changed by an operation on the second operation unit to be transmitted from the imaging device to the external flash via the first communication unit and the second communication unit, to cause a setting for the external flash to be applied.

Note that, the present embodiment is not limited to the embodiment described above, and various modifications are possible without departing from the scope of the present disclosure. Furthermore, the advantageous effects described in the present specification are merely examples and are not limited to them, and other effects may be included.

REFERENCE SIGNS LIST

11 Imaging system
12 Camera body
13 External flash
13A Commander
13B Receiver
21 Display unit
22 Operation unit
31 Display unit
32 Operation unit
41 Operation signal acquisition unit
42 Display control unit
43 Storage unit
44 Shutter control unit
45 Shutter drive unit
46 Photometric unit
47 Communication unit
48 Control unit
51 Optimization processing unit
52 Setting coordination processing unit
53 Communication compatibility processing unit
61 Operation signal acquisition unit
62 Display control unit
63 Storage unit
64 Light emission control unit
65 Light emitting unit
66 Wireless communication unit
67 Communication unit
68 Pulse width measurement unit
69 Control unit
71 Optimization processing unit
72 Setting coordination processing unit
73 Communication compatibility processing unit

The invention claimed is:

1. An imaging system, comprising:
an external flash including a first communication unit, a first display unit, and a first operation unit; and
an imaging device including a second communication unit, a second display unit, and a second operation unit, wherein the imaging device is configured to:
transmit and receive first setting information of the external flash between the first communication unit and the second communication unit;
control the second display unit to display a first setting screen to be used for setting a first setting item of a plurality of setting items of the external flash, wherein the first setting screen hides at least one setting item of the plurality of setting items; and
transmit the first setting information, changed by an operation on the second operation unit, to the external flash via the first communication unit and the second communication unit, wherein a setting for the external flash to be applied is based on the transmitted first setting information.

2. The imaging system according to claim 1, wherein on the first setting screen displayed on the second display unit, a second setting item of a plurality of setting items is displayed or hidden depending on a function of the external flash.

3. The imaging system according to claim 1, wherein
the first communication unit is configured to transmit a settable state or an unsettable state at present of the first setting item set in the external flash to the imaging device, and
the second display unit is configured to perform display differently depending on whether the first setting item is in the settable state or the unsettable state set in the external flash.

4. The imaging system according to claim 3, wherein
the second display unit is configured to display the first setting item in the unsettable state in a grayed-out manner.

5. The imaging system according to claim 1, wherein
in a case where the first setting information of the external flash is changed by an operation on the first operation unit, the first setting screen displayed on the second display unit is hidden.

6. The imaging system according to claim 1, wherein
the external flash is connected to the imaging device, and another external flash that is not connected to the imaging device is further included,
the another external flash performs wireless communication with the external flash, and
the imaging device is further configured to:
transmit and receive second setting information of the another external flash between the first communication unit and the second communication unit;
control the second display unit to display a second setting screen to be used for setting a setting item of the another external flash; and
transmit the second setting information, changed by an operation on the second operation unit, to the external flash via the first communication unit and the second communication unit, and
transmit the changed second setting information to the another external flash by wireless communication, wherein a setting for the another external flash to be applied is based on the changed second setting information.

7. The imaging system according to claim 6, wherein
the first communication unit is configured to transmit a settable state or an unsettable state at present of the setting item set in the another external flash acquired by wireless communication to the imaging device, and
the second display unit is configured to display the setting item of the another external flash differently depending on whether the setting item is in the settable state or the unsettable state set in the another external flash.

8. The imaging system according to claim 7, wherein
the second display unit is configured to display the setting item of the another external flash in the unsettable state in a grayed-out manner.

9. The imaging system according to claim 6, wherein
in a case where the setting information of the another external flash is changed by an operation on a third operation unit included in the another external flash, the second setting screen displayed on the second display unit is hidden.

10. The imaging system according to claim 1, wherein
the first communication unit is configured to collectively transmit data of the plurality of the setting items as one piece of the first setting information.

11. The imaging system according to claim 10, wherein
the plurality of the setting items settable in the external flash is collectively transmitted once at a timing when the external flash is mounted on the imaging device or at a timing when power of the imaging device is turned on.

12. A control method, by an imaging system including:
an external flash including a first communication unit, a first display unit, and a first operation unit; and
an imaging device including a second communication unit, a second display unit, and a second operation unit, comprising:
   transmitting and receiving setting information of the external flash between the first communication unit and the second communication unit;
   controlling the second display unit to display a setting screen to be used for setting a setting item of a plurality of setting items of the external flash, wherein the setting screen hides at least one setting item of the plurality of setting items; and
   transmitting the setting information, changed by an operation on the second operation unit, to the external flash via the first communication unit and the second communication unit, wherein a setting for the external flash to be applied is based on the transmitted setting information.

13. A non-transitory computer-readable medium having stored thereon computer-executable instructions which, when executed by an imaging system, cause the imaging system to execute operations, the imaging system including:
   an external flash including a first communication unit, a first display unit, and a first operation unit; and
   an imaging device including a second communication unit, a second display unit, and a second operation unit, the operations comprising:
      transmitting and receiving setting information of the external flash between the first communication unit and the second communication unit;
      controlling the second display unit to display a setting screen to be used for setting a setting item of a plurality of setting items of the external flash, wherein the setting screen hides at least one setting item of the plurality of setting items; and
      transmitting the setting information, changed by an operation on the second operation unit, to the external flash via the first communication unit and the second communication unit, wherein a setting for the external flash to be applied is based on the transmitted setting information.

* * * * *